United States Patent [19]

Miyauchi et al.

[11] Patent Number: 5,184,252
[45] Date of Patent: Feb. 2, 1993

[54] FINDER OPTICAL SYSTEM

[75] Inventors: Yuji Miyauchi, Okaya; Shinichi Yoshii, Urawa; Tatsuru Kanamori, Tokyo, all of Japan

[73] Assignee: Olympus Optical Co., Ltd., Tokyo, Japan

[21] Appl. No.: 680,548

[22] Filed: Apr. 4, 1991

[30] Foreign Application Priority Data

Apr. 6, 1990 [JP] Japan ................................ 2-91771
Apr. 6, 1990 [JP] Japan ................................ 2-91772

[51] Int. Cl.$^5$ ...................... G02B 13/18; G02B 13/02; G02B 9/12; G02B 9/34
[52] U.S. Cl. ................................... 359/715; 354/219; 359/716; 359/774; 359/792
[58] Field of Search .............. 359/660, 644, 715, 708, 359/726, 728, 786, 661, 774, 792, 716; 354/219

[56] References Cited

U.S. PATENT DOCUMENTS 4,751,539  5/1988  Yamada et al. .................... 354/222
4,926,201  5/1990  Mukai et al. ...................... 359/708

FOREIGN PATENT DOCUMENTS 63-30812   2/1988  Japan .
63-44616   2/1988  Japan .
63-44617   2/1988  Japan .
1-154114   6/1989  Japan .
1-255825  10/1989  Japan .

*Primary Examiner*—Scott J. Sugarman
*Attorney, Agent, or Firm*—Cushman, Darby & Cushman

[57] ABSTRACT

A finder optical system including an objective having a positive refractive power, an image erecting optical member for erecting an image formed by the objective, and an eyepiece for allowing observation of the image formed by the objective and erected by the image erecting optical member. The objective consists of a first positive lens component and a second negative lens component, or a single lens having a convex surface on the object side. This finder optical system has a simple composition, a compact external design and a relatively wide field angle.

4 Claims, 6 Drawing Sheets

FINDER OPTICAL SYSTEM

BACKGROUND OF THE INVENTION a) Field of the invention

The present invention relates to a finder optical system of the real image type which is suited for use with compact cameras such as photographic cameras and video cameras.

b) Description of the prior art

Since most of the photographic lens systems used for compact cameras have wide field angles, it was necessary to design finder optical systems which also had wide field angles like those of the photographic lens systems. These conventional finder optical systems were mostly Albada finders and the inverse Galilean finders of the virtual image type which could easily have relatively wide field angles.

However, these finder optical systems of the virtual image type had a common defects that they obliged to enlarge diameters on the lens components arranged on the object side therein, and that they lowered legibility on the display members which indicate visual field frames and so on.

Accordingly, the finder optical systems of the real image type such as Keplerian optical finder optical systems have recently attracted attention once again and widely been adopted as exemplified by the optical finder systems disclosed by Japanese Preliminary Utility Model Publication No. Sho 63-30812 and Japanese Preliminary Patent Publication Nos. Sho 63-44616, Sho 63-44617, Hei 1-154114 and Hei 1-255825.

However, the above-mentioned conventional finder optical systems of the real image type pose a common problem: they inevitably use a large numbers of parts, and have complicated compositions and large external designs.

SUMMARY OF THE INVENTION

A primary object of the present invention is to provide a finder optical system of the real image type which has a simple composition, a small external design and a relatively wide field angle.

The finder optical system according to the present invention comprises an objective having a positive refractive power, an optical member for erecting an image of object formed by the objective, and an eyepiece used for allowing observation of the image formed by the objective and having a postive refractive power.

The objective consists of a first positive lens component and a second negative lens component, or a single lens having a convex surface on the object side.

When the objective consists of a first positive lens component and a second negative lens component, the objective is designed so as to satisfy the following condition (1):

$$0.03 < |f_p/f_n| < 0.4 \tag{1}$$

wherein the reference symbol $f_p$ represents the focal length of the first positive lens component and the reference symbol $f_n$ designates the focal length of the second negative lens component.

This composition selected for the finder optical system according to the present invention permits shortening the total length of the objective and thinning the camera to be used therewith even when a relatively wide visual field is necessary. The abovementioned condition (1) relates to the ratio between the focal lengths of the first lens component having positive refractive power and of the second lens component having negative refractive power which compose the objective. If this ratio is so low as to be smaller than the lower limit of the condition (1), it will be impossible to sufficiently correct curvature of Patzval's image surface. If the ratio is so large as to exceed the upper limit of the condition (1), in contrast, the second lens component will have too strong a refractive power, thereby making it difficult to transmit the pupil. Further, when the visual field is to be widened relatively, it is desirable that the lens component having the negative refractive power in the objective comprises at least one meniscus lens element convex on the side of the image surface.

When the objective consists of a single lens having the convex surface on the object side, the objective is designed so as to satisfy the following conditions (2) and (3):

$$|r_{ASP}/r_{SP}| < 1 \tag{2}$$

$$0.04 < 1/f_O < 0.2 \tag{3}$$

wherein the reference symbol $r_{ASP}$ represents the paraxial radius of curvature on one of the surfaces of the objective which is designed as an aspherical surface, the reference symbol $r_{SP}$ designates the radius of curvature on the other surface of the objective which is designed as a spherical surface and the reference symbol $f_O$ denotes the focal length of the objective.

The condition (2) relates to the ratio between the radii of curvature on the surfaces of the objective when they are designed as an aspherical surface and a spherical surface respectively. If the ratio has a value so large as to exceed the range defined by the condition (2), it will be difficult to correct distortion and astigmatism especially when the finder is to have a wide visual field. The aspherical surface should have a shape which lowers curvature on the portions thereof which are farther from the optical axis. Further, the condition (3) relates to the refractive power of the objective. If the refractive power is so weak as to be lower than the lower limit of the condition (3), the back focal length of the objective as measured to the intermediate image surface will be prolonged, thereby making it impossible to design compactly the camera to be used with the finder optical system. If the ratio is so large as to exceed the upper limit of the condition (3), in contrast, it will be difficult to correct aberrations, especially astigmatism.

When it is desired to further widen the visual field of the finder, it is preferable to design the objective so as to satisfy the following condition (4):

$$|r_2/r_1| < 1 \tag{4}$$

wherein the reference symbols $r_1$ and $r_2$ represent the radii of curvature on the surfaces of the objective which are located on the object side and the image side respectively.

The condition (4) relates to the ratio between the radius of curvature on the object side surface and that on the image side surface of the objective. If this ratio is so large as to exceed the range defined by the condition (4), the image side surface cannot have a refractive power stronger than that of the object side surface, thereby making it impossible to widen the visual field.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Now, the present invention will be described in more detail below with reference to the preferred embodiments illustrated in the accompanying drawings.

Embodiment 1

Figure 1:
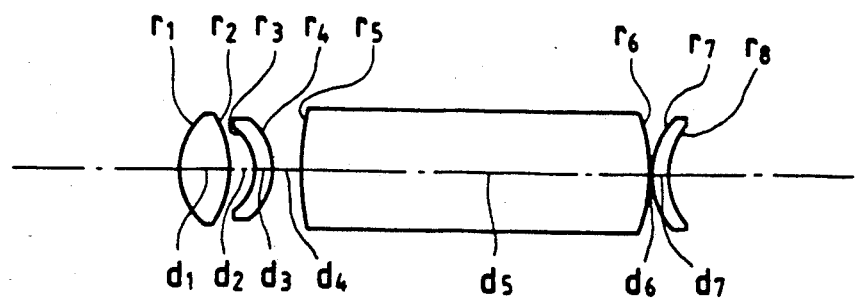
FIG. 1 and FIG. 2 show a sectional view and graphs illustrating composition and aberration characteristics respectively of Embodiment 1 of the finder optical system of the real image type according to the present invention.
Figure 2:
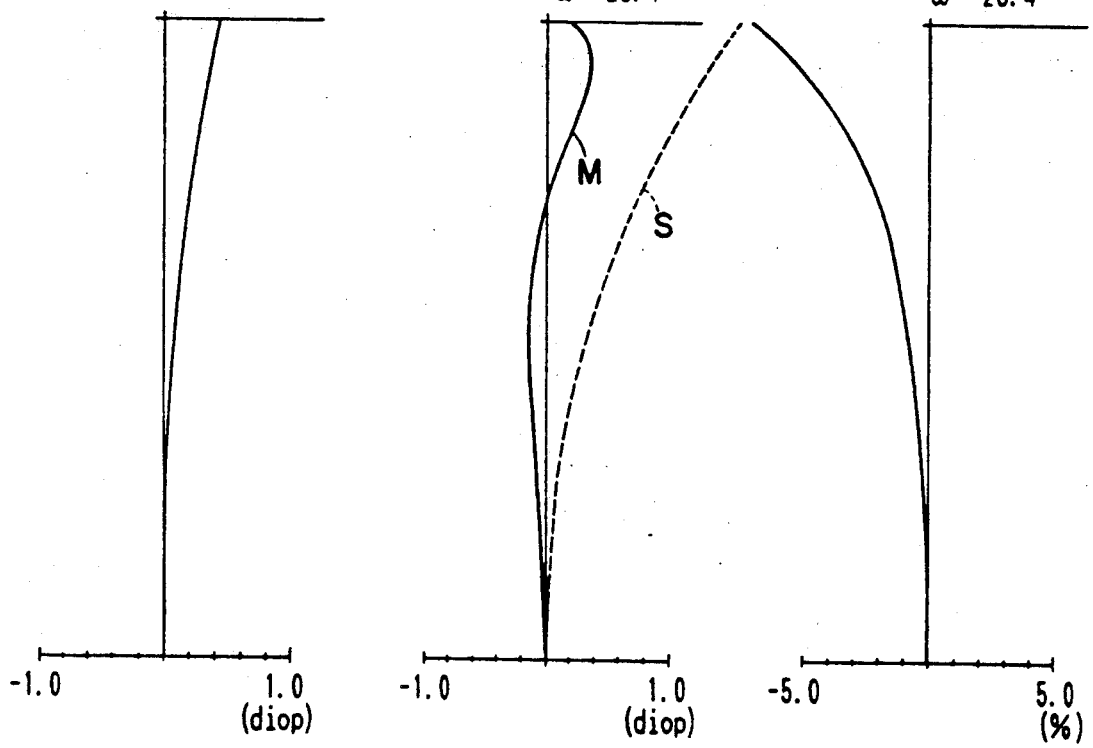

Embodiment 1 of the finder optical system according to the present invention has the composition and aberration characteristics illustrated in FIG. 1 and FIG. 2 respectively, and is designed on the basis of the numerical data given below:

$|f_p/f_n| = 0.155$
$\omega = 28.4°$, magnification: 0.4 ×

$r_1 = 7.2297$
$\quad d_1 = 5.0000 \quad n_1 = 1.49216 \quad \nu_1 = 57.50$
$r_2 = -6.2222$ (aspherical surface)
$\quad d_2 = 2.6112$
$r_3 = -5.0366$
$\quad d_3 = 1.5251 \quad n_2 = 1.49216 \quad \nu_2 = 57.50$
$r_4 = -6.9649$
$\quad d_4 = 3.1154$
$r_5 = 24.4797$
$\quad d_5 = 36.0000 \quad n_3 = 1.49216 \quad \nu_3 = 57.50$
$r_6 = -16.7387$
$\quad d_6 = 0.2000$
$r_7 = 7.0180$ (aspherical surface)
$\quad d_7 = 1.8177 \quad n_4 = 1.49216 \quad \nu_4 = 57.50$
$r_8 = 7.8069$
$\quad d_8 = 15.0000$
$r_9$ (pupil)

Aspherical coefficients
Second surface
$E = 0.12494 \times 10^{-2}, F = 0.21459 \times 10^{-4},$
$G = -0.59617 \times 10^{-6}, H = 0.11124 \times 10^{-7}$
Seventh surface
$E = -0.12701 \times 10^{-3}, F = 0.31781 \times 10^{-6},$
$G = -0.11557 \times 10^{-6}$

Embodiment 2

Figure 3:
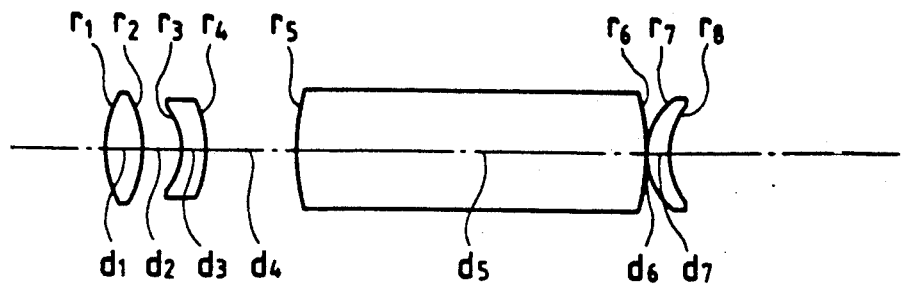
FIG. 3 and FIG. 4 show a sectional view and graphs illustrating composition and aberration characteristics respectively of Embodiment 2 of the present invention.
Figure 4:
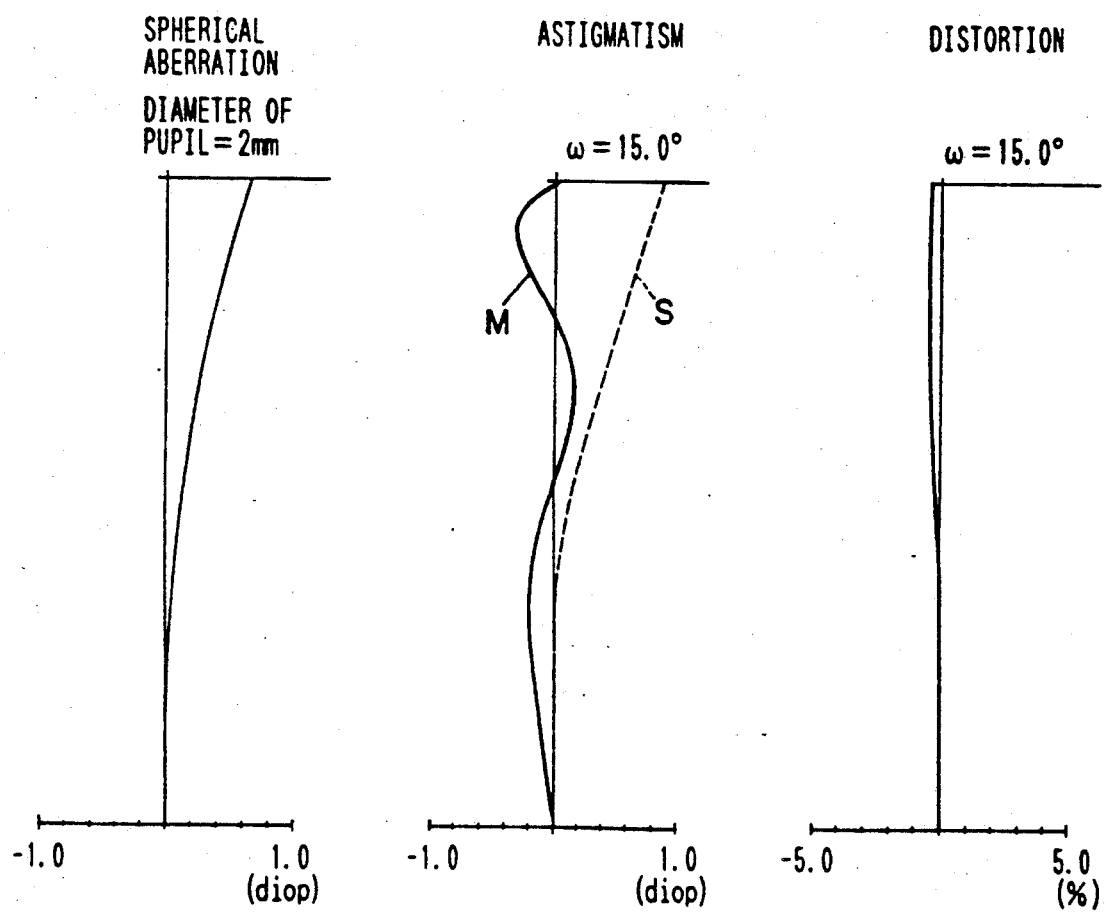

The finder optical system preferred as Embodiment 2 of the present invention has the composition and aberration characteristics visualized in FIG. 3 and FIG. 4 respectively, and is designed on the basis of the numerical data shown below:

$|f_p/f_n| = 0.318$
$\omega = 15.0°$, magnification: 0.75 ×

$r_1 = 12.9988$
$\quad d_1 = 3.3051 \quad n_1 = 1.49216 \quad \nu_1 = 57.50$
$r_2 = -10.9120$ (aspherical surface)
$\quad d_2 = 4.0000$
$r_3 = -6.8764$
$\quad d_3 = 2.3844 \quad n_2 = 1.49216 \quad \nu_2 = 57.50$
$r_4 = -11.8207$
$\quad d_4 = 9.2044$
$r_5 = 24.4797$
$\quad d_5 = 36.0000 \quad n_3 = 1.49216 \quad \nu_3 = 57.50$
$r_6 = -16.7387$
$\quad d_6 = 0.2000$
$r_7 = 7.0180$ (aspherical surface)
$\quad d_7 = 1.8177 \quad n_4 = 1.49216 \quad \nu_4 = 57.50$
$r_8 = 7.8069$
$\quad d_8 = 15.0000$
$r_9$ (pupil)

Aspherical coefficients
Second surface
$E = 0.14175 \times 10^{-3}, F = -0.12520 \times 10^{-4},$
$G = -0.86489 \times 10^{-6}, H = -0.20901 \times 10^{-7}$
Seventh surface
$E = -0.12701 \times 10^{-3}, F = 0.31781 \times 10^{-6},$
$G = -0.11557 \times 10^{-6}$

Embodiment 3

Figure 5:
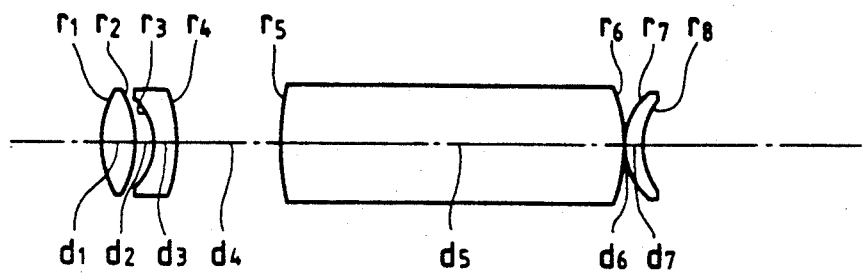
FIG. 5 and FIG. 6 show a sectional view and curves illustrating composition and aberration characteristics respectively of Embodiment 3 of the present invention.
Figure 6:
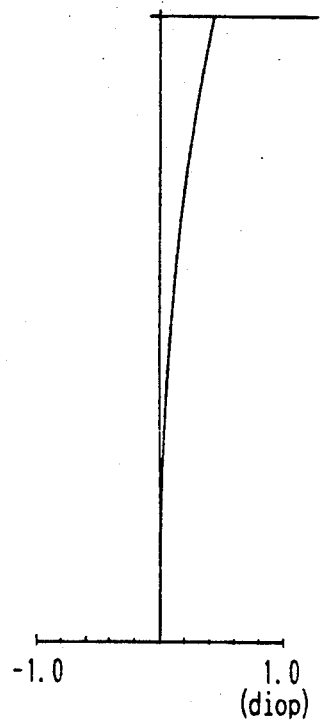
Figure 6:
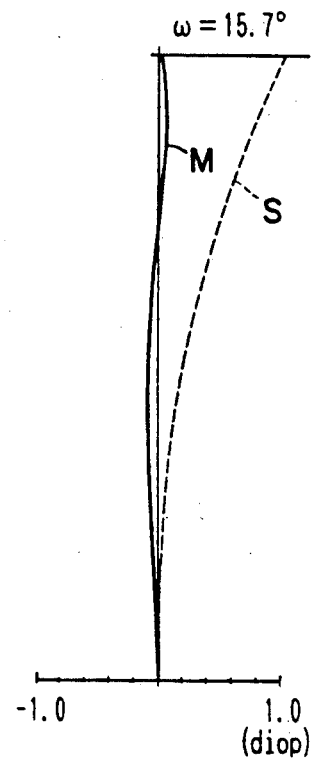
Figure 6:
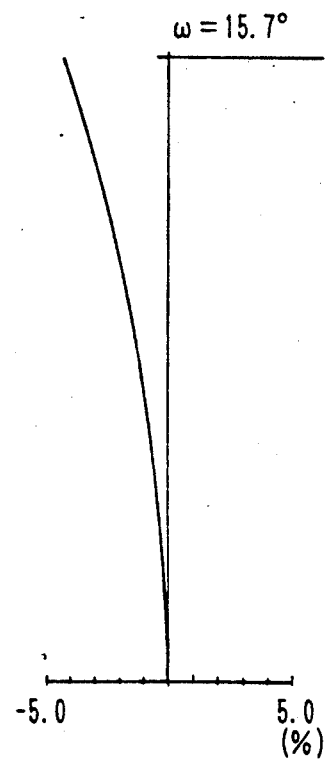

FIG. 5 and FIG. 6 show composition and aberration characteristics of Embodiment 3 of the present invention which is designed on the basis of the following numerical data:

$|f_p/f_n| = 0.39$
$\omega = 15.7°$, magnification: 0.74 ×

$r_1 = 9.6322$
$\quad d_1 = 3.3051 \quad n_1 = 1.49216 \quad \nu_1 = 57.50$
$r_2 = -11.4156$ (aspherical surface)
$\quad d_2 = 2.0000$
$r_3 = -6.5716$
$\quad d_3 = 2.3844 \quad n_2 = 1.49216 \quad \nu_2 = 57.50$
$r_4 = -13.7710$
$\quad d_4 = 10.9219$
$r_5 = 24.4797$
$\quad d_5 = 36.0000 \quad n_3 = 1.49216 \quad \nu_3 = 57.50$
$r_6 = -16.7387$
$\quad d_6 = 0.2000$
$r_7 = 7.0180$ (aspherical surface)
$\quad d_7 = 1.8177 \quad n_4 = 1.49216 \quad \nu_4 = 57.50$
$r_8 = 7.8069$
$\quad d_8 = 15.0000$
$r_9$ (pupil)

Aspherical coefficients
Second surface
$E = 0.41541 \times 10^{-5}, F = 0.66681 \times 10^{-6},$
$G = -0.14124 \times 10^{-6}, H = 0.73266 \times 10^{-9}$
Seventh surface
$E = -0.12701 \times 10^{-3}, F = 0.31781 \times 10^{-6},$
$G = -0.11557 \times 10^{-6}$

Embodiment 4

Figure 7:
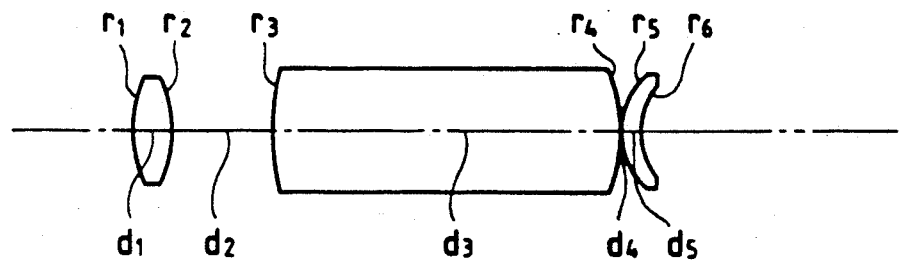
FIG. 7 and FIG. 8 show a sectional view and curves visualizing composition and aberration characteristics respectively of Embodiment 4 of the present invention.
Figure 8:
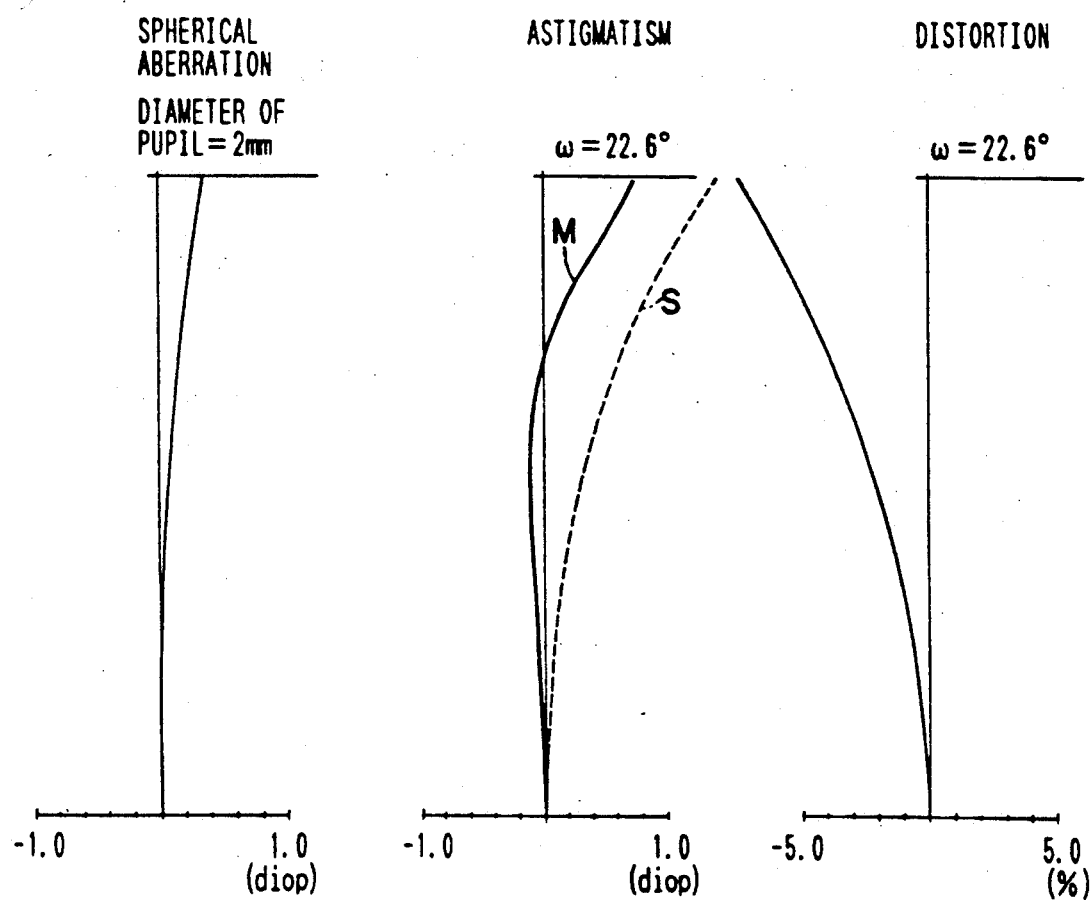

FIG. 7 and FIG. 8 visualize composition and aberration characteristics of the finder optical system preferred as Embodiment 4 of the present invention which is designed with the numrical data listed below:

| $\|r_{ASP}/r_{SP}\| = 0.732$ | | | |
|---|---|---|---|
| $1/F_o = 0.0603 \ (1/mm)$ | | | |
| $\omega = 16.2°$, magnification: $0.73 \times$ | | | |
| $r_1 = 13.6322$ | (aspherical surface) | | |
| | $d_1 = 3.5000$ | $n_1 = 1.49216$ | $\nu_1 = 57.50$ |
| $r_2 = -18.5892$ | | | |
| | $d_2 = 15.1703$ | | |
| $r_3 = 24.4797$ | | | |
| | $d_3 = 36.0000$ | $n_2 = 1.49216$ | $\nu_2 = 57.50$ |
| $r_4 = -16.7387$ | | | |
| | $d_4 = 0.2000$ | | |
| $r_5 = 7.0180$ | (aspherical surface) | | |
| | $d_5 = 1.8177$ | $n_3 = 1.49216$ | $\nu_3 = 57.50$ |
| $r_6 = 7.8069$ | | | |
| | $d_6 = 15.0000$ | | |
| $r_7$ (pupil) | | | |
| Aspherical coefficients | | | |
| first surface | | | |
| $E = -0.17015 \times 10^{-3}, F = 0.34018 \times 10^{-5}$, | | | |
| $G = -0.12290 \times 10^{-6}, H = 0.16948 \times 10^{-8}$ | | | |
| fifth surface | | | |
| $E = -0.12701 \times 10^{-3}, F = 0.31781 \times 10^{-6}$, | | | |
| $G = -0.11557 \times 10^{-6}$ | | | |

Embodiment 5

Figure 9:
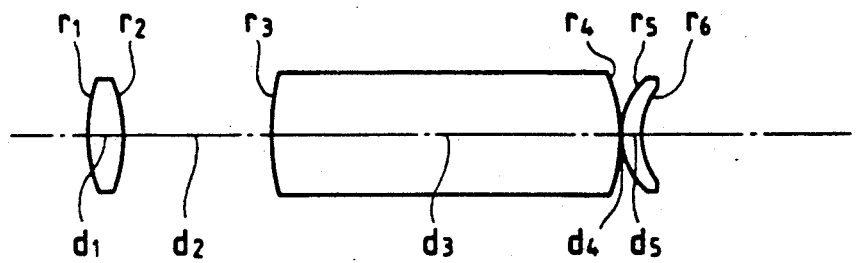
FIG. 9 and FIG. 10 show a sectional view and graphs visualizing composition and aberration characteristics respectively of Embodiment 5 of the present invention.
Figure 10:
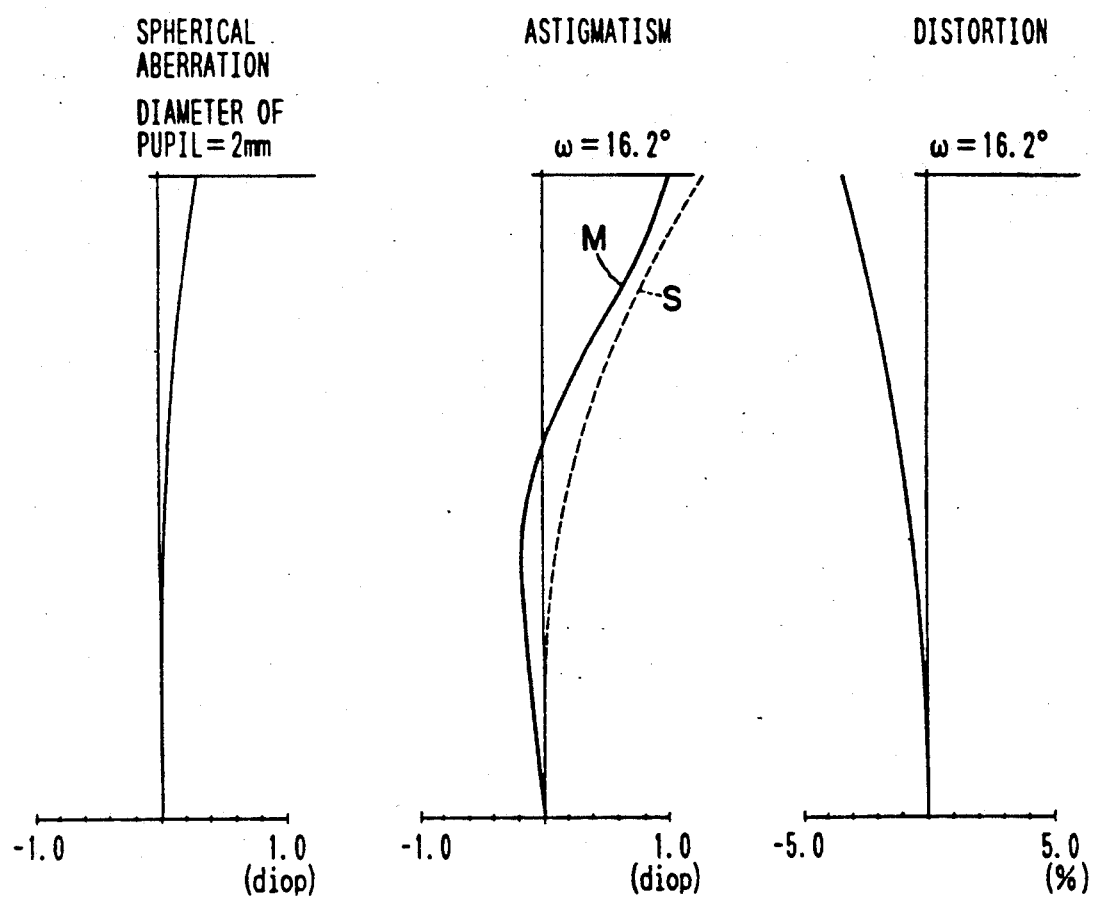

Embodiment 5 of the finder optical system according to the present invention has the composition and aberration characteristics shown in FIG. 9 and FIG. 10 respectively, and is designed with the numerical data listed below:

| $\|r_{ASP}/r_{SP}\| = 0.907$ | | | |
|---|---|---|---|
| $1/F_o = 0.0852 \ (1/mm)$ | | | |
| $\omega = 22.6°$, magnification: $0.52 \times$ | | | |
| $r_1 = 10.3082$ | (aspherical surface) | | |
| | $d_1 = 4.2448$ | $n_1 = 1.49216$ | $\nu_1 = 57.50$ |
| $r_2 = -11.3651$ | | | |
| | $d_2 = 10.1469$ | | |
| $r_3 = 24.4797$ | | | |
| | $d_3 = 36.0000$ | $n_2 = 1.49216$ | $\nu_2 = 57.50$ |
| $r_4 = -16.7387$ | | | |
| | $d_4 = 0.2000$ | | |
| $r_5 = 7.0180$ | (aspherical surface) | | |
| | $d_5 = 1.8177$ | $n_3 = 1.49216$ | $\nu_3 = 57.50$ |
| $r_6 = 7.8069$ | | | |
| | $d_6 = 15.0000$ | | |
| $r_7$ (pupil) | | | |
| Aspherical coefficients | | | |
| first surface | | | |
| $E = -0.63326 \times 10^{-3}, F = = -0.14213 \times 10^{-4}$, | | | |
| $G = 0.74788 \times 10^{-6}, H = 0.26740 \times 10^{-7}$ | | | |
| second surface | | | |
| $E = -0.12701 \times 10^{-3}, F = 0.31781 \times 10^{-6}$, | | | |
| $G = -0.11557 \times 10^{-6}$ | | | |

Embodiment 6

Figure 11:
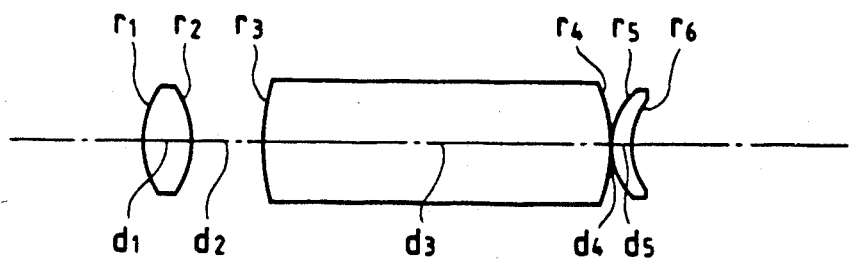
FIG. 11 and FIG. 12 show a sectional view and graphs illustrating composition and aberration characteristics respectively of Embodiment 6 of the present invention.
Figure 12:
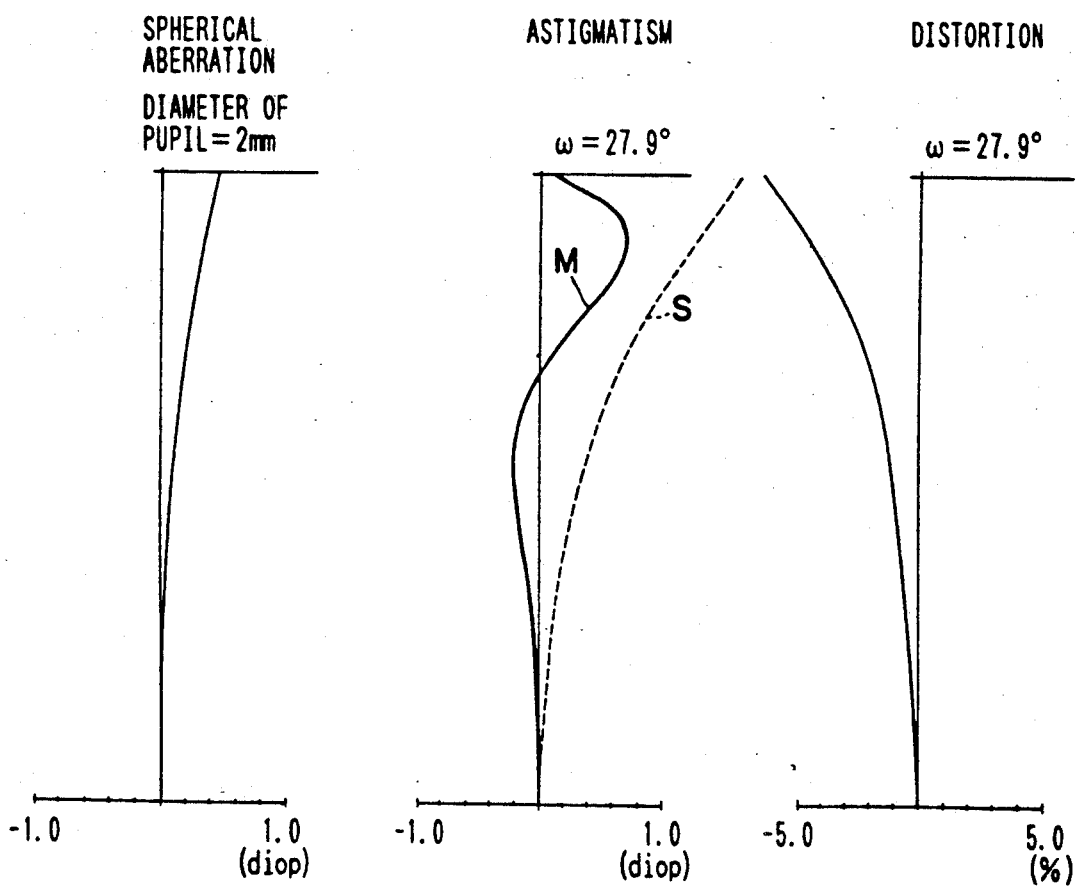

FIG. 11 and FIG. 12 illustrate composition and aberration characteristics respectively of the Embodiment 6 of the finder optical system of real image type according to the present invention which is designed with the numerical data presented below:

| $\|r_{ASP}/r_{SP}\| = 0.679 = \|r_2/r_1\|$ | | | |
|---|---|---|---|
| $1/F_o = 0.111 \ (1/mm)$ | | | |
| $\omega = 27.9°$, magnification: $0.4 \times$ | | | |
| $r_1 = 9.8988$ | | | |
| | $d_1 = 5.0000$ | $n_1 = 1.49216$ | $\nu_1 = 57.50$ |
| $r_2 = -6.7242$ | (aspherical surface) | | |
| | $d_2 = 7.5273$ | | |
| $r_3 = 24.4797$ | | | |
| | $d_3 = 36.0000$ | $n_2 = 1.49216$ | $\nu_2 = 57.50$ |
| $r_4 = -16.7387$ | | | |
| | $d_4 = 0.2000$ | | |
| $r_5 = 7.0180$ | (aspherical surface) | | |
| | $d_5 = 1.8177$ | $n_3 = 1.49216$ | $\nu_3 = 57.50$ |
| $r_6 = 7.8069$ | | | |
| | $d_6 = 15.0000$ | | |
| $r_7$ (pupil) | | | |
| Aspherical coefficients | | | |
| Second surface | | | |
| $E = 0.10354 \times 10^{-2}, F = 0.53538 \times 10^{-4}$, | | | |
| $G = -0.28968 \times 10^{-5}, H = 0.95025 \times 10^{-7}$ | | | |
| Fifth surface | | | |
| $E = -0.12701 \times 10^{-3}, F = 0.31781 \times 10^{-6}$, | | | |
| $G = -0.11557 \times 10^{-6}$ | | | | wherein the reference symbols $r_{asp}$ and $r_{sp}$ represent the radii of curvature on the aspherical surface and the spherical surface respectively used in the objective, the reference symbol $f_o$ designates the focal length of the objective, the reference symbol $\omega$ denotes the half field angle, the reference symbols $r_1, r_2, \ldots$ represent the radii of curvature on the surfaces of the individual lens components, the reference symbols $d_1, d_2, \ldots$ designate the airspaces reserved between the lens components, the reference symbols $n_1, n_2, \ldots$ denote the indices of refraction of the individual lens components, and the reference symbols $\nu_1, \nu_2, \ldots$ represent the Abbe's numbers of the individual lens components.

In addition, the shapes of the aspherical surfaces used in the embodiments described above are expressed by the following formula when the direction of the optical axis is taken as the ordinate X and the direction perpendicular to the optical axis is taken as the abscissa Y:

$$X = \frac{CY^2}{1 + \sqrt{1 - C^2Y^2}} + EY^4 + FY^6 + GY^8 + HY^{10}$$

wherein the reference symbol C represents the curvature ($=1/r$) as measured on the vertex of the aspherical surface of interest, and the reference symbols E, F, G and H designate the aspherical coefficients respectively.

As is understood from the numerical data listed above, it is possible to shorten the total length of an objective so as to design compactly a finder optical system by composing the objective of a positive lens component and a negative lens component which are arranged sequentially in the order from the object side. The finder optical system can be made even more compact when the objective is composed of a single lens. This effect is further enhanced by using at least one aspherical surface in the reflecting member and the eyepiece composing the eyepiece optical system.

What is claimed is:

1. A finder optical system comprising: an objective including a first positive lens component and a second negative lens component, an image erecting optical system for erecting an image formed by said objective, and an eyepiece for allowing observation of the image formed by said objective and erected by said image erecting optical system; said finder optical system satisfying the following condition:

$$0.03 < |f_p/f_n| < 0.4$$

wherein the reference symbol $f_p$ represents the focal length of said first lens component and the reference symbol $f_n$ designates the focal length of said second lens component.

2. A finder optical system comprising an objective consisting of a single positive lens having a convex surface on the object side, an image erecting optical system for erecting an image formed by said objective, and an eyepiece for allowing observation of the image formed by said objective and erected by said image erecting optical system.

3. A finder optical system according to claim 2 satisfying the following conditions:

$$|r_{asp}/r_{sp}| < 1$$

$$0.04 < 1/f_o < 0.2$$

wherein the reference symbol $r_{asp}$ represents the paraxial radius of curvature on an aspherical surface which is one of the surfaces of said objective, the reference symbol $r_{sp}$ designates the radius of curvature on a spherical surface which is the other surface of said objective and the reference symbol $f_o$ denotes the focal length of said objective.

4. A finder optical system according to claim 3 satisfying the following condition:

$$|r_2/r_1| < 1$$

wherein the reference symbols $r_1$ and $r_2$ represent the radii of curvature on the object side surface and the image said surface respectively of said objective.

* * * * *